United States Patent
Kaufman et al.

(10) Patent No.: US 9,410,793 B2
(45) Date of Patent: Aug. 9, 2016

(54) VIRTUAL LASER PROJECTION SYSTEM AND METHOD

(71) Applicant: Laser Projection Technologies, Inc., Londonderry, NH (US)

(72) Inventors: Steven P. Kaufman, Hooksett, NH (US); Arkady Savikovsky, Burlington, MA (US); Masoud Mohazzab, Andover, MA (US)

(73) Assignee: Laser Projection Technologies, Inc., Londonderry, NH (US)

( * ) Notice: Subject to any disclaimer, the term of this patent is extended or adjusted under 35 U.S.C. 154(b) by 0 days.

(21) Appl. No.: 14/453,390

(22) Filed: Aug. 6, 2014

(65) Prior Publication Data

US 2015/0043011 A1 Feb. 12, 2015

Related U.S. Application Data

(60) Provisional application No. 61/862,947, filed on Aug. 6, 2013.

(51) Int. Cl.
| | |
|---|---|
| *B42D 25/29* | (2014.01) |
| *G01B 11/00* | (2006.01) |
| *G01B 11/24* | (2006.01) |
| *G01B 11/25* | (2006.01) |
| *G01B 11/245* | (2006.01) |

(52) U.S. Cl.
CPC .............. *G01B 11/002* (2013.01); *G01B 11/24* (2013.01); *G01B 11/245* (2013.01); *G01B 11/2518* (2013.01)

(58) Field of Classification Search
CPC .................................. G01B 11/00; G01C 3/08
See application file for complete search history.

(56) References Cited

U.S. PATENT DOCUMENTS

| | | | |
|---|---|---|---|
| 5,090,804 A | 2/1992 | Wong et al. | |
| 5,196,900 A | 3/1993 | Pettersen | |
| 5,341,183 A | 8/1994 | Dorsey-Palmateer | |
| 5,381,258 A | 1/1995 | Bordignon et al. | |
| 5,416,591 A | 5/1995 | Yoshimura et al. | |

(Continued)

FOREIGN PATENT DOCUMENTS

| | | |
|---|---|---|
| DE | 33 01 494 A1 | 7/1984 |
| EP | 1 288 754 A2 | 3/2003 |

(Continued)

OTHER PUBLICATIONS

International Search Report and Written Opinion for PCT/US2014/049967. Date of mailing—Dec. 8, 2014. 10 pages.

(Continued)

*Primary Examiner* — Tarifur Chowdhury
*Assistant Examiner* — Jamil Ahmed
(74) *Attorney, Agent, or Firm* — Finch & Maloney PLLC

(57) ABSTRACT

A virtual laser projection system and method includes one or more measuring laser projectors, one or more non-measuring laser projectors, an array of reference targets, and a computing system. The one or more measuring laser projectors and one or more non-measuring laser projectors operate under common control of the computing system to register their respective locations using the array of reference targets, detect and locate features of a work object to be illuminated, convert all location information into a common coordinate system, and illuminate the work object with laser light beams using the common coordinate system.

20 Claims, 9 Drawing Sheets

(56) References Cited

U.S. PATENT DOCUMENTS

| | | |
|---|---|---|
| 5,436,027 A | 7/1995 | Offer |
| 5,450,147 A | 9/1995 | Dorsey-Palmateer |
| 5,559,334 A | 9/1996 | Gupta et al. |
| 5,615,013 A | 3/1997 | Rueb et al. |
| 5,646,859 A | 7/1997 | Petta et al. |
| 5,651,600 A | 7/1997 | Dorsey-Palmateer |
| 5,661,667 A * | 8/1997 | Rueb ................ G06K 7/10831 348/202 |
| 5,663,795 A | 9/1997 | Rueb |
| 5,671,053 A | 9/1997 | Wigg et al. |
| 5,889,582 A | 3/1999 | Wong et al. |
| 5,894,123 A | 4/1999 | Ohtomo et al. |
| 5,956,143 A | 9/1999 | Kotidis |
| 5,957,559 A | 9/1999 | Rueb et al. |
| 5,988,862 A | 11/1999 | Kacyra et al. |
| 6,024,449 A | 2/2000 | Smith |
| 6,036,319 A | 3/2000 | Rueb et al. |
| 6,044,170 A | 3/2000 | Migdal et al. |
| 6,066,845 A | 5/2000 | Rueb et al. |
| 6,246,468 B1 | 6/2001 | Dimsdale |
| 6,304,680 B1 | 10/2001 | Blake et al. |
| 6,365,221 B1 | 4/2002 | Morton |
| 6,547,397 B1 | 4/2003 | Kaufman et al. |
| 6,847,462 B1 | 1/2005 | Kacyra et al. |
| 6,935,748 B2 | 8/2005 | Kaufman et al. |
| 7,215,430 B2 | 5/2007 | Kacyra et al. |
| 7,372,558 B2 | 5/2008 | Kaufman et al. |
| 7,887,191 B2 | 2/2011 | Dill et al. |
| 2005/0007562 A1 | 1/2005 | Seki et al. |
| 2005/0035943 A1 | 2/2005 | Kojima |
| 2005/0082262 A1 | 4/2005 | Rueb et al. |
| 2005/0088644 A1 | 4/2005 | Morcom |
| 2005/0121422 A1 | 6/2005 | Morden et al. |
| 2006/0170870 A1 | 8/2006 | Kaufman et al. |
| 2008/0246943 A1* | 10/2008 | Kaufman ........... G01B 11/2518 356/5.01 |

FOREIGN PATENT DOCUMENTS

| | | |
|---|---|---|
| WO | WO-03/032129 A2 | 4/2003 |
| WO | WO-2006/104565 A2 | 10/2006 |

OTHER PUBLICATIONS

"Update: Automated repair," High Performance Composites, www.compositesworld.com (Mar. 2007), pp. 34-36.

* cited by examiner

VIRTUAL LASER PROJECTION SYSTEM AND METHOD

CROSS-REFERENCE TO RELATED APPLICATIONS

This application claims the benefit of U.S. Provisional Application No. 61/862,947, titled "Virtual Laser Projection System and a Method," filed Aug. 6, 2013, hereby incorporated by reference in its entirety.

FIELD OF DISCLOSURE

This invention relates to laser projection systems.

BACKGROUND

Industrial laser projection systems are widely used today in different processes that require 3D templating: composite ply layup, assembly operations, painting mask layout, and others. It gives the user ability to eliminate expensive hard tools, jigs, templates, and fixtures. Laser projection also brings flexibility and full computer-assisted design (CAD) compatibility into the assembly process.

Laser projectors utilize CAD data to generate glowing templates on a three-dimensional work object surface. Glowing templates generated by laser projection are used in production assembly processes to assist in the precise positioning of parts, components, and the like on any flat or curvilinear surfaces. Presently laser projection technology is widely used in manufacturing of composite parts, in aircraft and marine industries, or other large machinery assembly processes, truss building, and other applications.

To ensure accurate projection, the laser projectors of the laser projection system are registered relative to the object coordinate system. In other words, the locations and orientation of the laser projectors in 3D space are determined with respect to the work object. Usually registration is accomplished using the projector's ability to scan retro-reflective targets attached to the object. This process is known as alignment or "buck-in." Large objects or objects with highly contoured surfaces usually require coverage by more than one laser projector, each of which are be bucked-in.

SUMMARY

Disclosed herein are systems for projecting image data onto a work object surface, the system including an array of reference targets, a measuring laser projector, at least one non-measuring laser projector, and a computer having one or more processors configured to: cause the measuring laser projector to direct a first laser light beam at a subset of the targets in the array of reference targets, cause the measuring laser projector to receive reflected light from the subset of the targets in the array of reference targets, register the measuring laser projector with respect to a first coordinate system based on the received reflected light, cause the measuring laser projector to direct a second laser light beam onto the work object surface, cause the measuring laser projector to receive diffusely reflected light from the work object surface, detect a plurality of features of the work object surface based on the received diffusely reflected light, determine the locations of the plurality of features with respect to a first coordinate system, obtain the location of the plurality of features with respect to a second coordinate system, determine the locations of the plurality of features and the at least one non-measuring laser projector in a common coordinate system, and cause the at least one non-measuring laser projector to project the image data onto the work object surface based on the locations of the plurality of features and the location of the at least one laser projector in the common coordinate system.

Further disclosed herein are methods for projecting image data onto a work object surface, the methods including: directing a first laser light beam from a measuring laser projector at a subset of targets in an array of reference targets, receiving the reflected light from the subset of targets in the array of reference targets at the measuring laser projector, registering the location of the measuring laser projector with respect to a first coordinate system based on the received reflected light, directing a second laser light beam from the measuring laser projector at the work object surface, receiving diffusely reflected light from the work object surface at the measuring laser projector, detecting a plurality of features of the work object surface based on the diffusely reflected light, determining the location of the plurality of features with respect to a first coordinate system, obtaining the location of the plurality of features with respect to a second coordinate system, determining the locations of the plurality of features and at least one laser projector in a common coordinate system, and projecting the image data onto the work object surface based on the locations of the plurality of features and the location of the at least one laser projector in the common coordinate system.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

Disclosed herein is a laser projection system that does not require retro-reflective targets to be directly located on a work object, and can accommodate mobile laser projectors that do not have fixed, known coordinates within a work area. The system includes an array of reference targets and one or more laser projectors capable of detecting those targets. At least one of the laser projectors, referred to as a "measuring laser projector," is capable of detecting some geometric features of a work object and measuring the locations of those features in 3D space.

Using the locations of the geometric features determined by the laser projection system relative to an external coordinate system, and known locations of the geometric features within a work object coordinate system, the laser projection system is able to identify the positions and orientations of the laser projectors and the work object within a common coordinate system. By placing the locations of the laser projectors and work object in a common coordinate system, the laser projection system is able to coordinate the projection of the laser projectors to precisely and accurately display image data on the surface of the work object.

Figure 1:
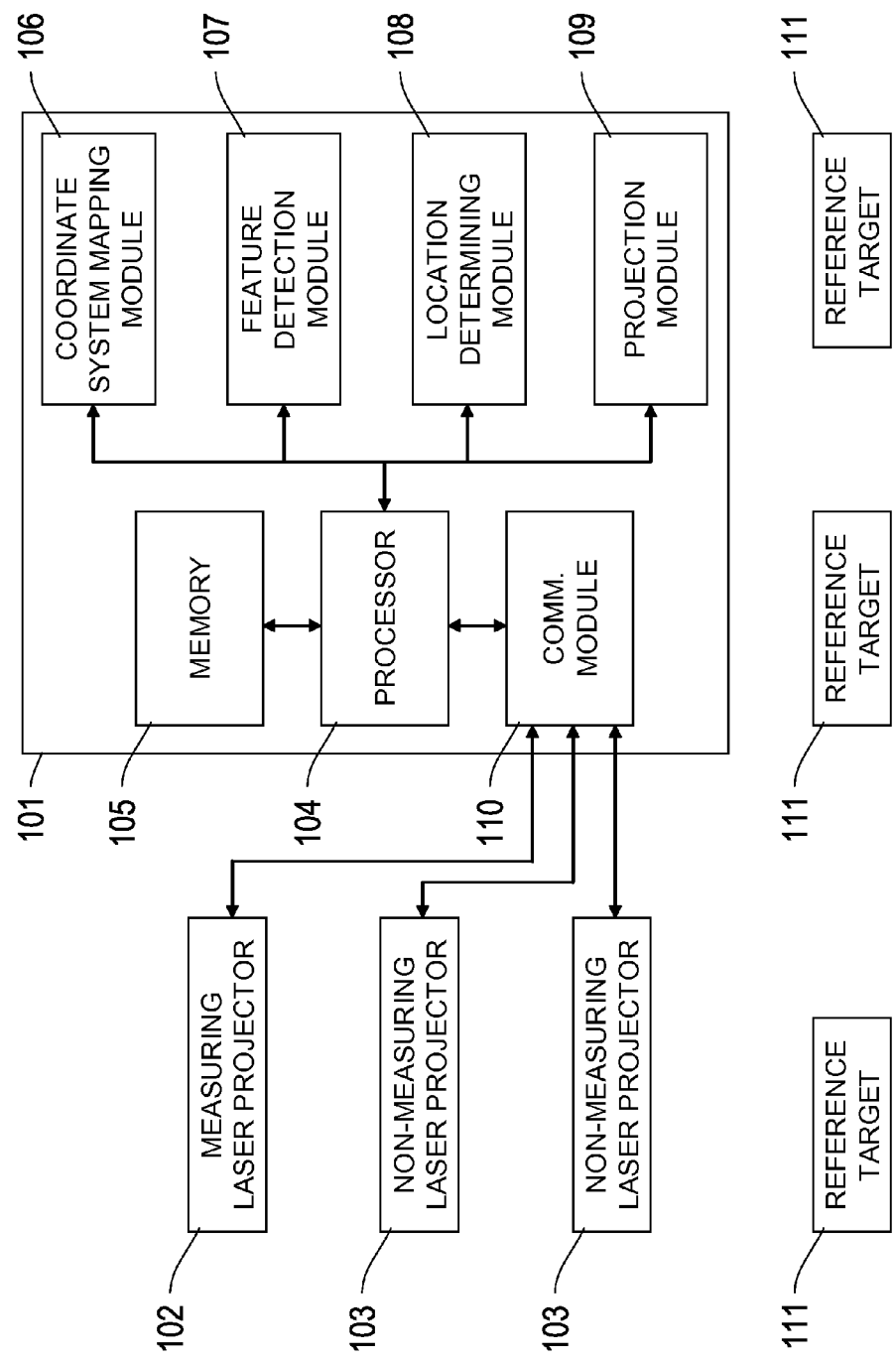
FIG. 1 is a block diagram of an example virtual laser projection system.

FIG. 1 is a block diagram of an example virtual laser projection system 100. The virtual laser projection system 100 includes a computing system 101, which controls one or more measuring laser projectors 102 and non-measuring laser projectors 103. The laser projectors 102 and non-measuring laser projectors 103 register themselves using an array of reference targets 111. The computing system 101 includes one or more processors 104 configured to execute the laser projection methods disclosed herein.

The one or more processors 104 may include a microprocessor, microcontroller, an application-specific integrated circuit, or one or more programmable integrated circuits such as a field-programmable gate array or complex programmable logic device, or the like. Instructions for performing the steps of the methods may be stored in a computer memory 105. The computer memory 105 may comprise any of the available types of memory such as random access memory, FLASH memory, a hard disk drive, a solid-state drive, or any combination thereof. The computer memory 105 may also receive and store image data for projection onto a work object. The computer memory 105 can connect to the one or more processors 104 internally via a wire or bus, or in some cases externally via serial or parallel connection, or wirelessly via WiFi, Bluetooth, or the like.

The computing system 101 includes several modules for performing specialized computations of the method. For example, a coordinate system mapping module 106 can receive the location data in a first coordinate system and return corresponding location data in a second coordinate system. A feature detection module 107 can receive data from a measuring laser projector 102 and perform image processing operations to detect features of the work object. A location determining module 108 can provide coordinates for features detected by feature detection module 107. And a projection module 109 can receive CAD or other image data and generate commands to project the image data onto the work object. The preceding modules 106-109 may be implemented in software stored in the computer memory 105, or as separate physical logic components of the computing system 101, or any combination thereof. The functionality of each of these modules 106-109 is described further below.

The computing system 101 also includes a communications module 110 that transmits commands to, and receives data from, the one or more measuring laser projectors 102 and non-measuring laser projectors 103. Communication between the communications module 110 and the one or more measuring laser projectors 102 and non-measuring laser projectors 103 will typically occur via wired network and device connections such as Ethernet or USB, but communication can also occur wirelessly via Wi-Fi, Bluetooth, or other appropriate wireless communication format. The communications module 110 interfaces with the one or more processors 104 via a wire or bus, or in some cases externally via serial or parallel connection, or wirelessly via Wi-Fi, Bluetooth, or the like.

Figure 2:
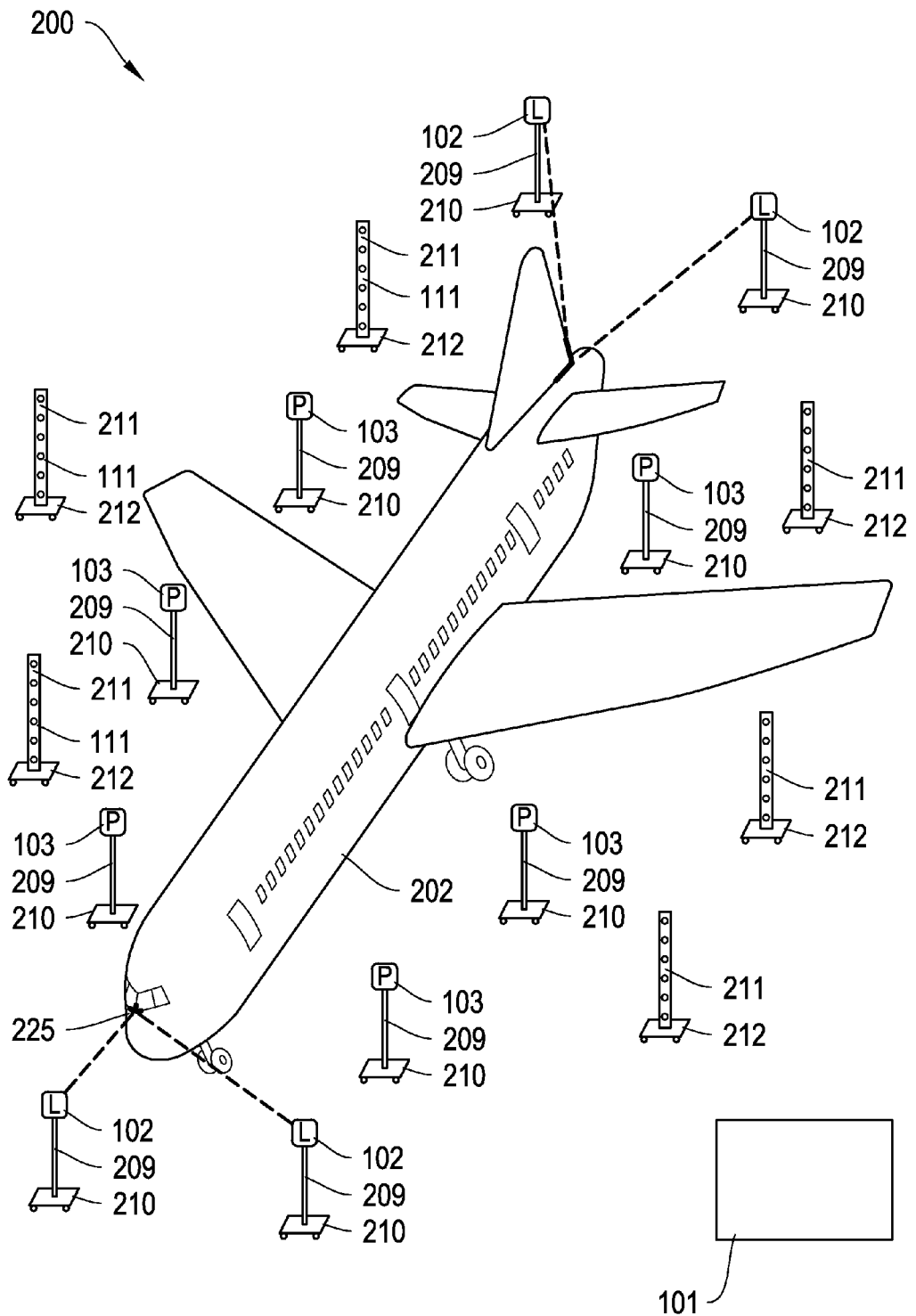
FIG. 2 shows a perspective view of an example virtual laser projection system and work object.

FIG. 2 is a perspective view of an example virtual laser projection system setup 200 including the virtual laser projection system 100 and a work object 202. The virtual laser projection system setup 200 includes four measuring laser projectors 102, an array of reference targets 111 mounted on posts 211, and six non-measuring laser projectors 103, as well as the computer system 101. The number of measuring laser projectors 102, non-measuring laser projectors 103, and reference targets 111 are merely illustrative in nature. The laser projection system setup 200 may have fewer or more of each without departing from the scope of this disclosure. The virtual laser projection system setup 200 is configured to project image data onto the work object 202, such as an aircraft. The system typically resides within a work cell, which may be an aircraft painting hangar or similar building or room.

The measuring laser projectors 102 are capable of detecting reference targets 111, and features 225 on the work object 202. They can also project image data onto a work surface of the work object 202, acting in that capacity similarly to non-measuring laser projectors. The measuring laser projectors 102 are typically mounted on posts 209 attached to movable carts 210. This facilitates the movement of the measuring laser projectors 102 into and out of the work cell during various phases of a livery process. Moveable measuring laser projectors 102 have the advantage of being removable during the livery process, which avoids the possibility of fouling the devices with paint or other substances, and also promotes safety by reducing the amount of electrical equipment present during the manufacturing process.

Implementations of the virtual laser projection system setup 200 may employ a measuring laser projector such as the laser radar projector disclosed in U.S. Pat. No. 8,085,388, the disclosure of which is hereby incorporated by reference in its entirety. Alternatively, the measuring laser projectors 102 can be arranged in a lasergrammetry system as described in PCT Patent Application No. PCT/US201033550, the disclosure of which is also hereby incorporated by reference in its entirety. Examples of suitable measuring laser projectors include the LPT12 and LPT15, referred to as laser projectors with feature detection, and LPT100, referred to as a laser radar measuring laser projector, provided by Laser Projection Technologies, Inc., headquartered in Londonderry, N.H. Systems employing laser radar measuring laser projectors as the measuring laser projectors 102 can utilize the laser radar function to reduce the number of measuring laser projectors 102 employed. The measuring laser projectors 102 include a laser light source and an optical signal sensor. The laser beam coming out of the laser light source can be directed across the field of view of the device, and the optical signal sensor can detect light reflected from a reference target 111, or light diffusely reflected from the work object 202 and utilized for feature detection.

Non-measuring laser projectors 103 are capable of detecting reference targets 111 and, by knowing the locations of the references targets 111 in an external coordinate system, can determine their own locations in that coordinate system. And when under computer control, they can project image data onto the work object 202. It is not necessary, however, that the non-measuring laser projectors 103 be able to detect and locate features of the work object 202 in the manner performed by measuring laser projectors 102. "Conventional" laser projectors such as the non-measuring laser projectors 103 may be less expensive than the measuring laser projectors 102, thus their use in conjunction with the measuring laser projectors for projecting image data onto large work objects may result in lower cost of the overall system. One example of a suitable non-measuring laser projector includes the LPT8 laser projector, provided by Laser Projection Technologies, Inc. Non-measuring laser projectors 103 are typically mounted on posts 209 attached to movable carts 210.

The reference targets 111 are typically arranged on posts 211, which can themselves be mounted on moveable carts 212 to facilitate moving the reference targets 111 into and out of a work cell; however, it is not necessary that the reference targets 111 be movable. In some implementations, some or all of the reference targets 111 are applied to a wall, ceiling, beam, pillar, or other fixed architectural feature of a work cell. In some implementations, some or all of the reference targets 111 are applied to the posts 209 upon which the measuring laser projectors 102 and the non-measuring laser projectors 103 are mounted, or on other external surfaces of the laser projectors 102 and 103. The reference targets 111 may have retro-reflective or other optical properties that facilitate detection by measuring and non-measuring laser projectors 102 and 103.

The arrangement of the reference targets 111 in the array need not form a spatially ordered array. Rather, the reference targets 111 in the array can be arranged to accommodate the layout of the work cell and geometry of the work object 202. Typically, at least some of the reference targets 111 face toward the work object 202 so they are within the field of view of a corresponding non-measuring laser projector 103 located on the opposite side of work object 202. A subset of the array of reference targets 111 may be located between the non-measuring laser projectors 103 and the work object 202. In that case, some of the reference targets 111 are faced away from the work object 202 and toward corresponding non-measuring laser projectors 103.

The array of reference targets 111 is used to register or "buck-in" the measuring laser projectors 102 and non-measuring laser projectors 103. In an initial step, conventional measurement techniques, such as photogrammetry, are used to determine the location of the reference targets 111 with respect to an arbitrary coordinate system, which is referred to herein as an external coordinate system. Such a measurement can be performed, for example, with a standard industrial photogrammetry camera. The measuring laser projectors 102 and non-measuring laser projectors 103 can detect and locate the reference targets 111 and use them as fiducials from which to determine their own locations within the external coordinate system.

Coordination of the projection of image data onto a work object 202 using measuring laser projectors 102 and non-measuring laser projectors 103 is performed under common control of computing system 101. Each non-measuring laser projector 103 and measuring laser projector 102 is capable of generating a glowing template or portion thereof on the portion of work object 202 within that laser projector's field of view. Patterns projected by adjacent non-measuring laser projectors 103 typically are stitched together to produce the outlines of, for example, a paint mask to be applied (e.g., the paint livery layout 540 in FIG. 5) across the entire surface of work object 202. Hence, the measuring laser projectors 102 and non-measuring laser projectors 103 can work together as a single "virtual" projector.

Figure 3A:
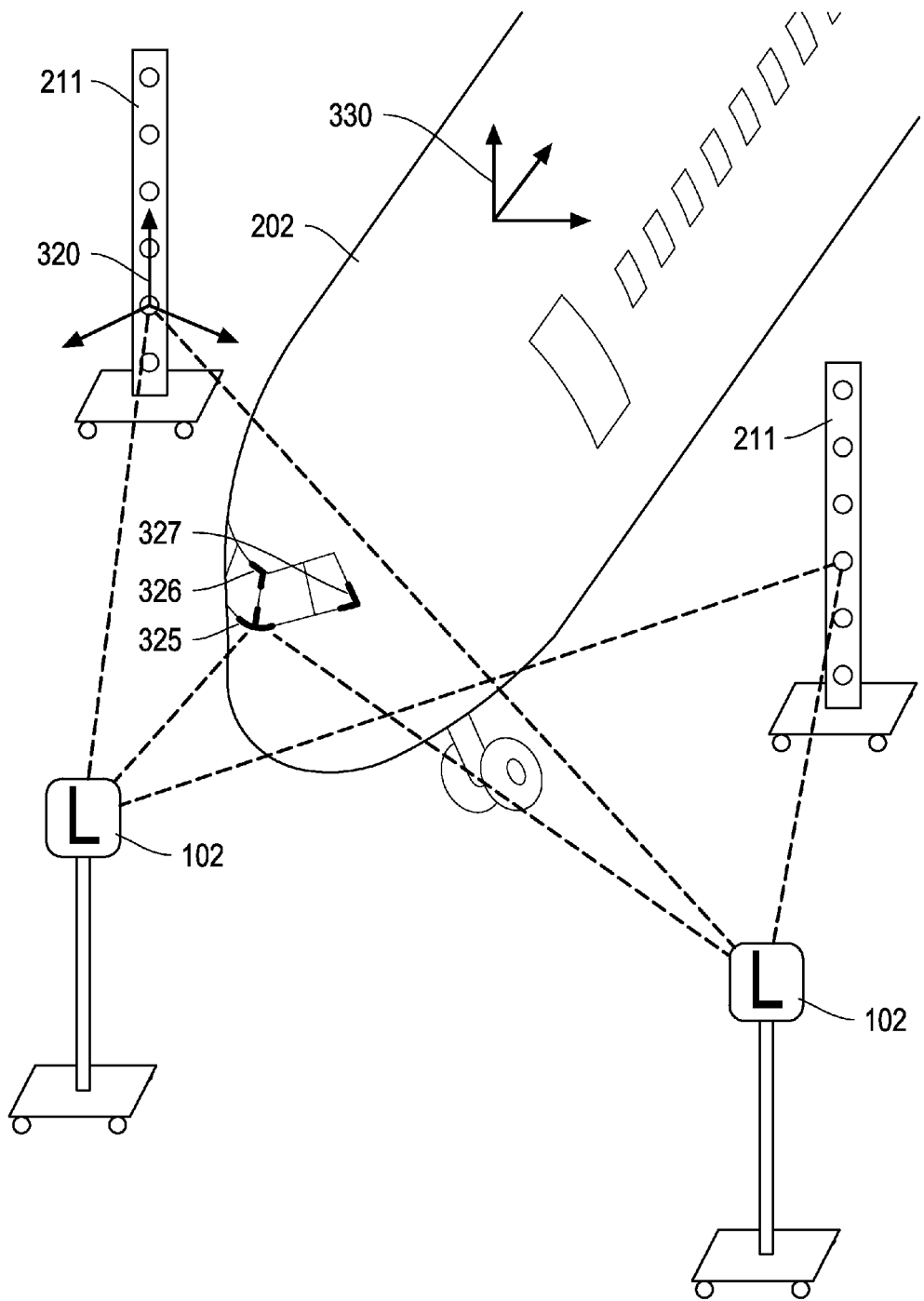
FIGS. 3A and 3B show perspective views of an example virtual laser projection system and work object.
Figure 3B:
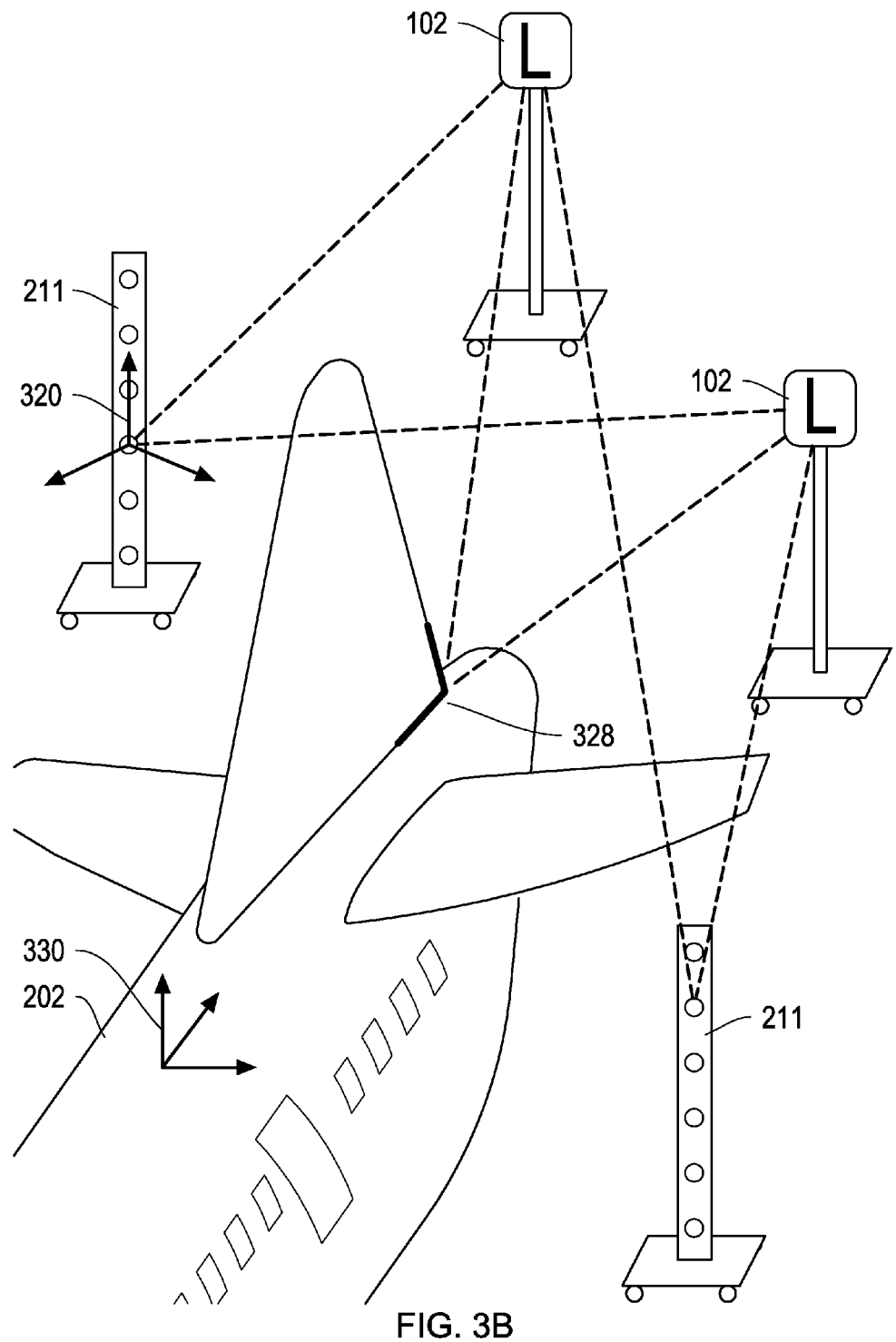

FIGS. 3A and 3B show perspective views of an example virtual laser projection system. FIG. 3A shows the measuring laser projectors 102 registering themselves using the array of reference targets 111, thereby locating themselves in an external coordinate system represented by the axes 320. The measuring laser projectors 102 then detect and locate non-retroreflective features of the work object 202, for example, features 325-327, which in FIG. 3A correspond to corners of an aircraft windshield. Other suitable work object features include edges, fasteners, holes, joints, or other distinguishable geometric features of the aircraft. The measuring laser projectors 102 determine the location of the features 325-327 with respect to the external coordinate system. The computing system 101 takes that location data and compares it to CAD data for the work object 202. The computing system 101 matches the coordinates of the features 325-327 as measured in the external coordinate system with their coordinates in an object coordinate system obtained from CAD data. The computing system 101 then calculates a transformation for mapping coordinates in the external coordinate system to coordinates in the object coordinate system. The transformation is then used to map the locations of the reference targets 111 from the external coordinate system into the object coordinate system. This transformation is performed using the methods set forth below. The measuring laser projectors 102 and non-measuring laser projectors 103 can then buck-in using the coordinates of the reference targets 111 in the object coordinate system. Thus, the object coordinate system can serve as a common coordinate system for the measuring laser projectors 102, the non-measuring laser projectors 103, and the work object 202. In other implementations, the external coordinate system can serve as the common coordinate system, with the locations of features of the work object 202 mapped from the object coordinate system (as they exist in the CAD data) to the external coordinate system.

FIG. 3B shows a similar configuration of the measuring laser projectors 102 and the reference targets 111, with the measuring laser projectors 102 detecting and locating feature 328 (the rear corner of the aircraft tail where it meets the fuselage) at the opposite end of work object 202. Only one feature 328 is shown for illustrative purposes, but in a typical process several features would be used to ensure accuracy of the subsequent operations. To ensure precise and accurate projection of image data onto the work object 202, features at both ends can be detected and located to allow for compensation of any deviation in the geometry of work object 202 from the predicted geometry due to scale errors or thermal expansion. Note that the vertices of the axes 320 and the axes 330, respectively, do not necessarily correspond to the origin of either coordinate system. For example, the axes 320 represent the axes of the external coordinate system in both FIGS. 3A and 3B, even though they appear in a different location in each figure.

Figure 4A:
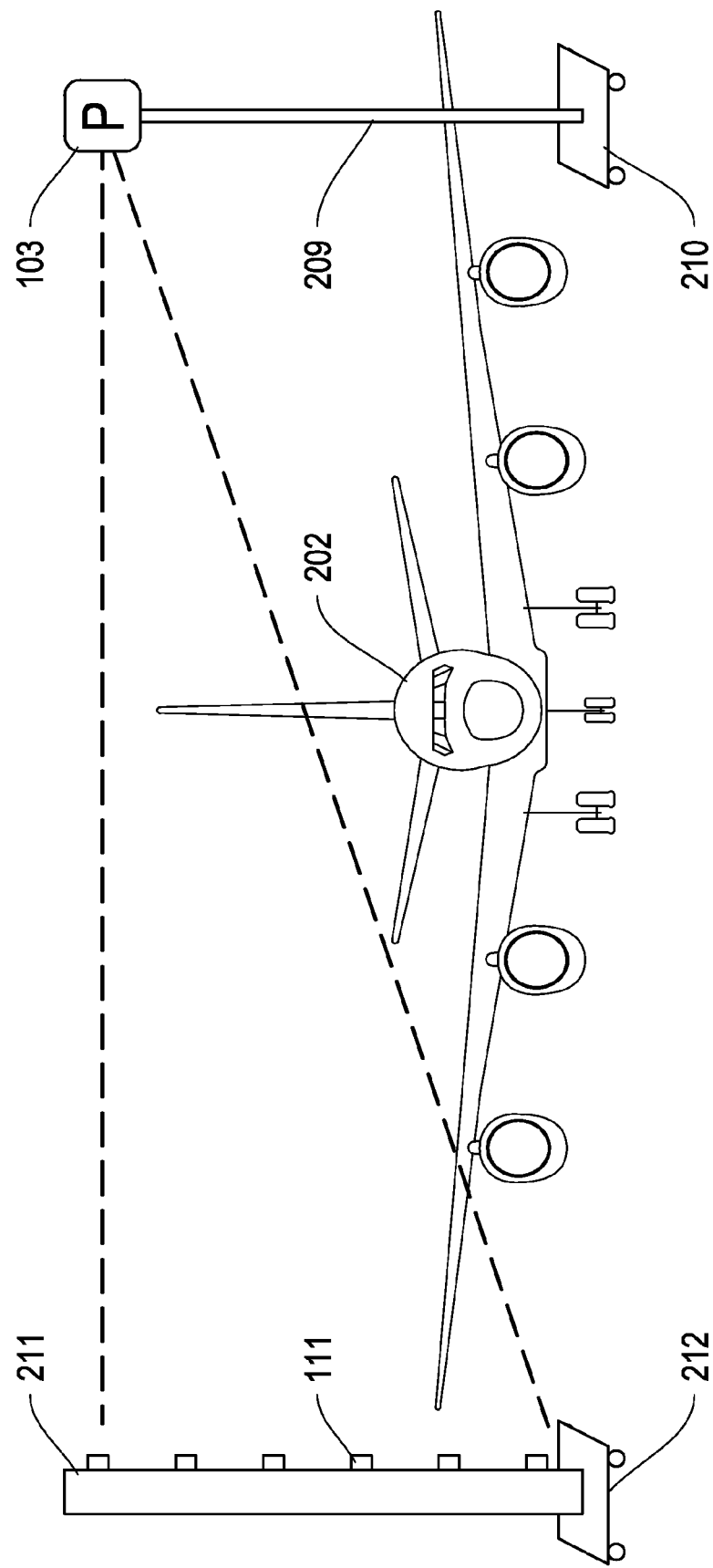
FIGS. 4A and 4B show front views of a portion of an example virtual laser projection system and work object.
Figure 4B:
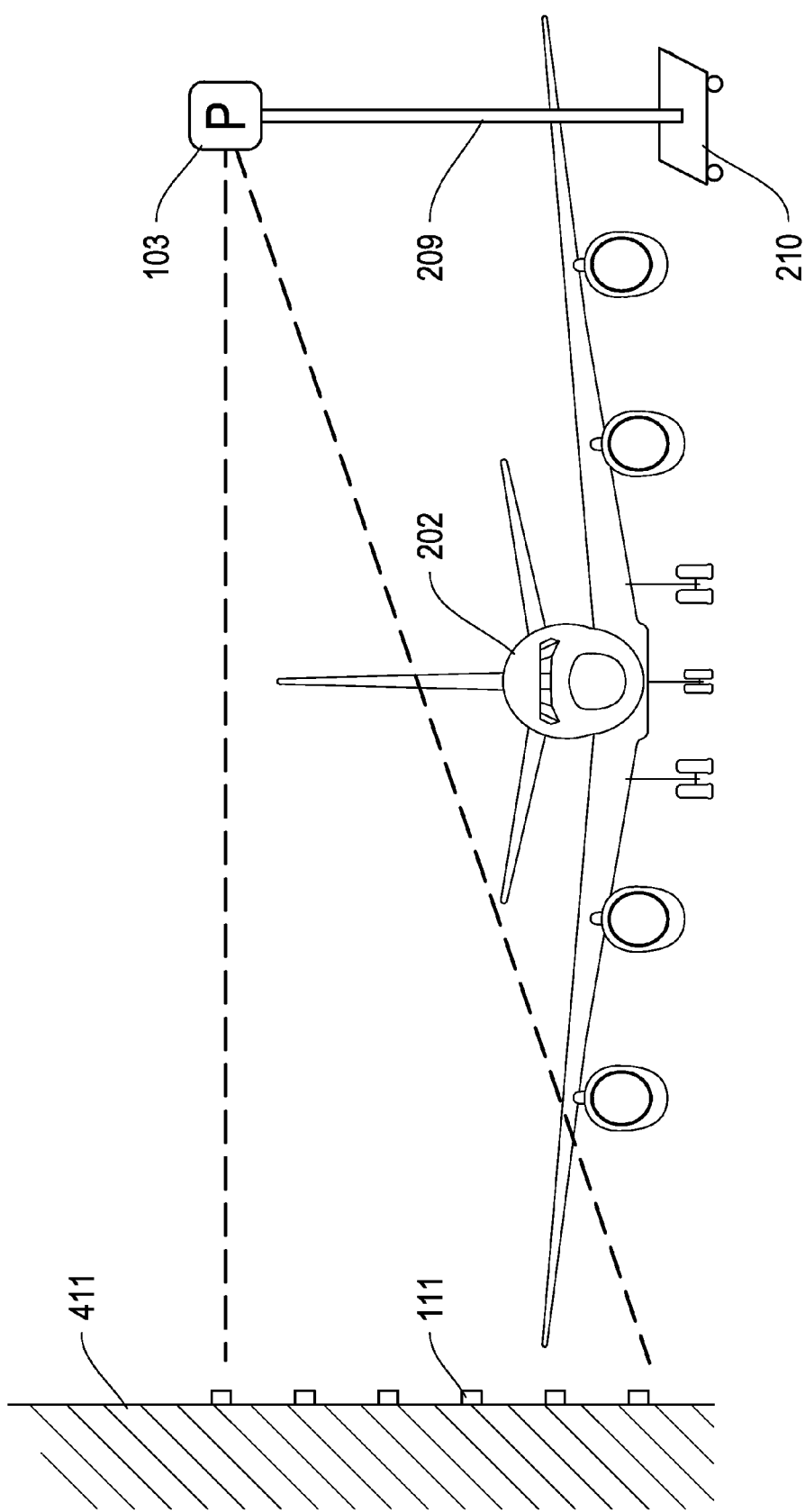

FIGS. 4A and 4B show alternative configurations of the virtual laser projection system setup 200. FIG. 4A shows a non-measuring laser projector 103 registering itself using reference targets 111, which are mounted on a post 211, which is itself mounted on a moveable cart 212. In this configuration, the targets can be moved into and out of the work cell, and arranged in place as needed.

FIG. 4B shows a configuration in which the some or all of the reference targets 111 are mounted to a wall 411 or some other fixed feature of the work cell. Operation of the system is essentially the same in this configuration as for the configuration in FIG. 4A; namely, the measuring laser projectors and non-measuring laser projectors 103 register themselves using the array of reference targets 111. This configuration in FIG. 4B may have certain advantages, however. For example, bucking-in using an array of reference targets 111 having fixed, known locations can promote consistency over successive livery processes when compared to buck-in using a movable array of reference targets 111 that will inevitably experience variation in placement. In addition, having known locations for the array of reference targets can eliminate the step of determining the locations of the array of reference targets 111 each time the virtual laser projection system 100 is setup. However, such implementations may require additional maintenance as the reference targets 111. For example, in the case of an aircraft painting process, they may become coated with paint over time, reducing their reflectivity, at which point they may need to be cleaned or replaced.

Figure 5:
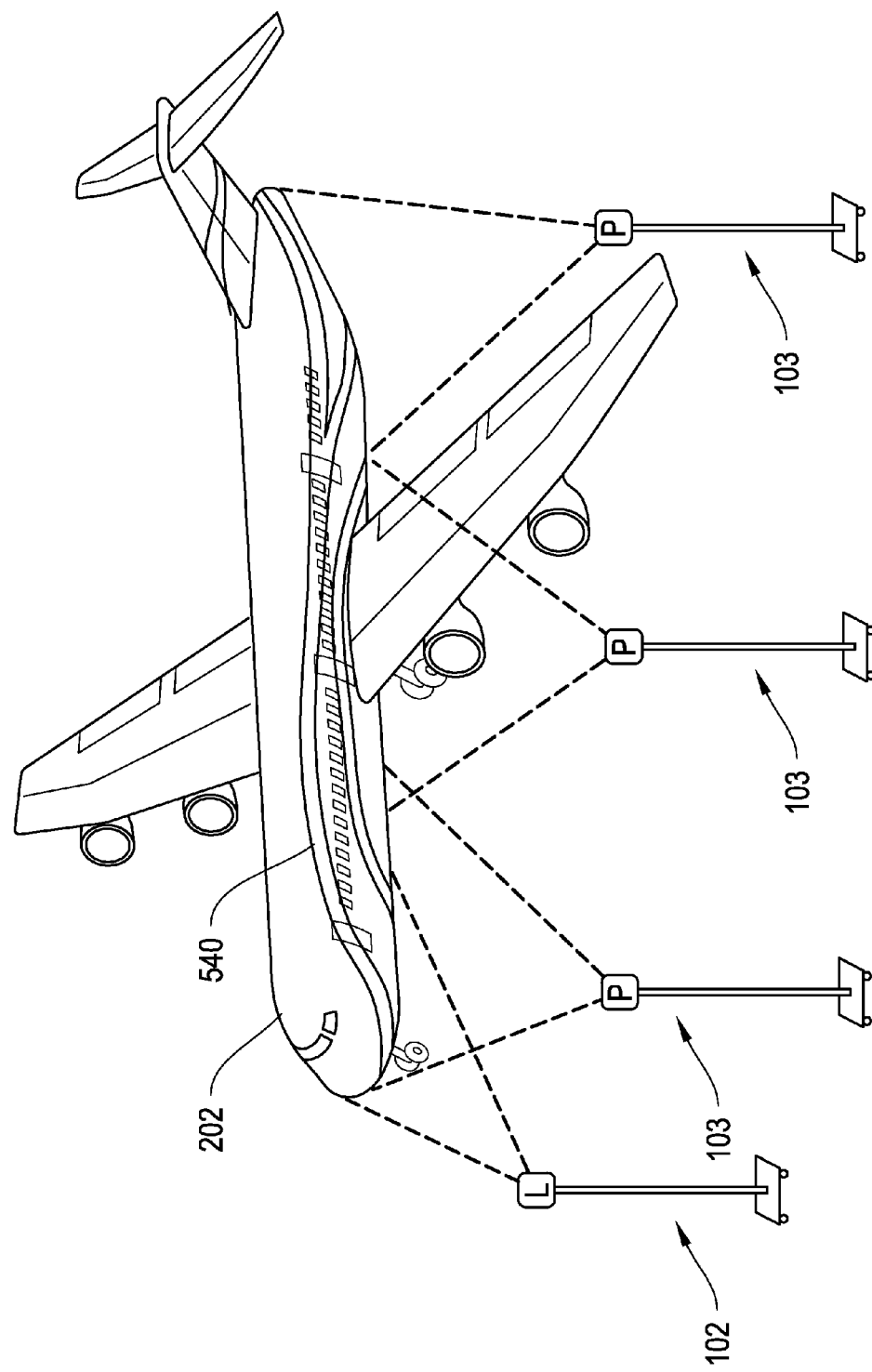
FIG. 5 shows a side view of an example virtual laser projection system illuminating a work object.

FIG. 5 is a side view of an example virtual laser projection system illuminating the work object 202. In FIG. 5, the measuring laser projector 102 and non-measuring laser projectors 103 have all been registered with respect to the work object coordinate system, and have combined their respective projected images to serve as a single coordinated virtual laser projector, illuminating a paint livery layout 540 across the entire length of the work object 202.

Figure 6:
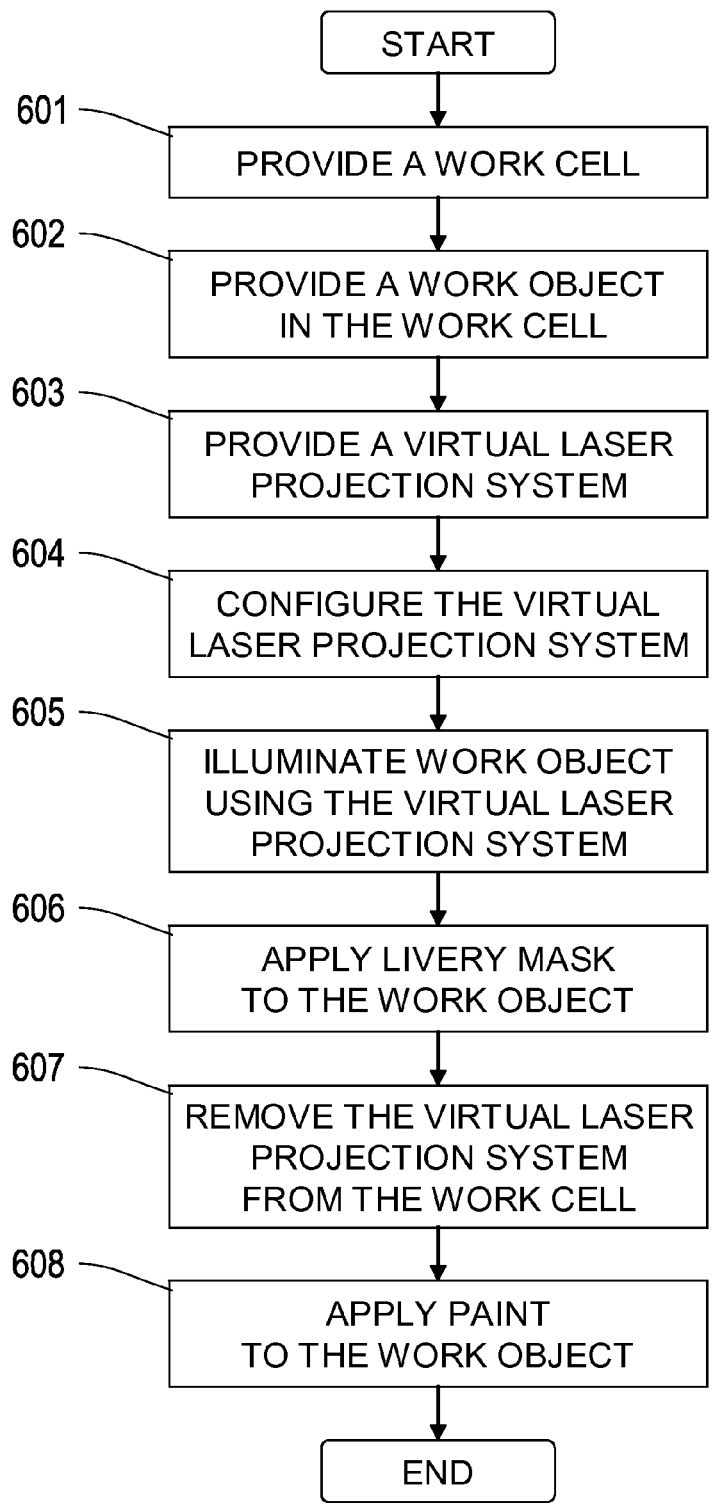
FIG. 6 is a flowchart of an example livery layout process.

FIG. 6 is a flowchart showing steps of an example livery layout process 600. First, a work cell in which to perform the layout livery process is provided (step 601). Such a work cell may be exterior (outside) or interior (in a hangar or similar building or room). Next, the work object 202 is placed within the work cell (step 602).

Once the work object 202 is in place, a virtual laser projection system 100 is removed from storage and deployed around the work object 202 (step 603). Deploying the laser projection system includes placing the reference targets 111, the measuring laser projectors 102 and the non-measuring laser projectors 103 in positions around the work object 202 as described above to achieve coverage of a desired portion of the work object 202. In some implementations, the measuring laser projectors 102, non-measuring laser projectors 103, and reference targets 111 are placed such that each measuring laser projector 102 and non-measuring laser projector 103 has at least six reference targets 111 visible within its field of view. After the reference targets 111 have been placed, the deployment (step 603) can further include using conventional measurement techniques to determine the location of the array of reference targets with respect to the external coordinate system. Such measurement can be performed, for example, with a standard industrial photogrammetry camera.

Figure 7:
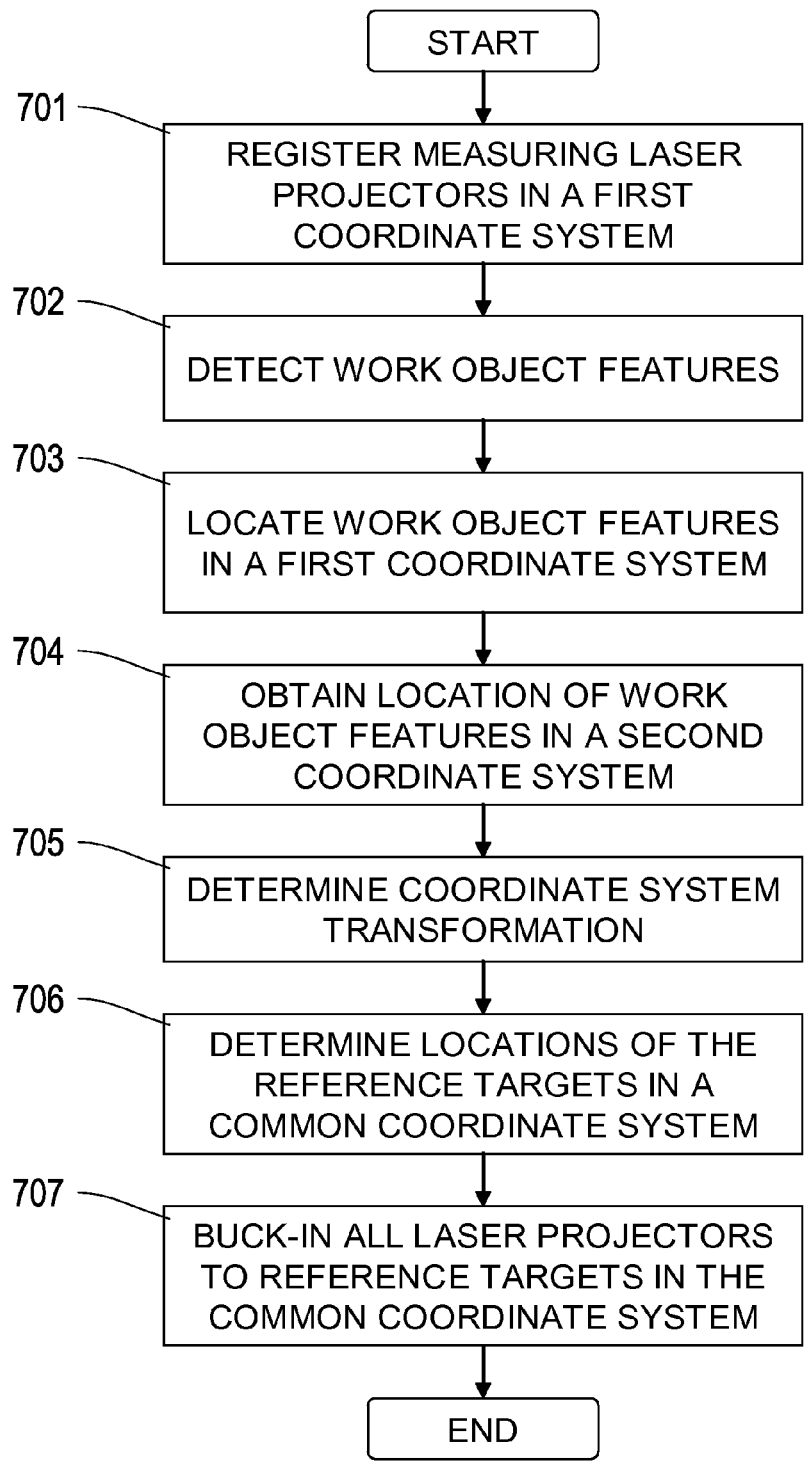
FIG. 7 is a flowchart of an example virtual laser projection system configuration method.

The virtual laser projection system 100 is then configured (step 604). This process is described further in FIG. 7. FIG. 7 is a flowchart showing steps of an example method for configuring a virtual laser projection system 100. The virtual laser projection method 700 can be suitable, for example, for carrying out step 604 of the method 600 mentioned above. First the virtual laser projection system 100 registers the location of the measuring laser projectors 102 with respect to an external coordinate system (step 701). Next, features of the work object are detected (step 702), and located (step 703). The virtual laser projection system 100 then obtains the location of these features in the object coordinate system (step 704). The method 700 further includes determining a coordinate system transformation for converting external coordinate system coordinates to object coordinate system coordinates (step 705). Using this transformation, the virtual laser projection system 100 can determine the location of the reference targets 111 in a common coordinate system (step 706). Finally, the measuring laser projectors 102 and non-measuring laser projectors 103 perform a buck-in using the reference targets 111 to determine their own respective locations in the object coordinate system (step 707). In some implementations, the locating of the reference targets 111 using conventional measurement techniques described above as part of step 603 can be considered part of the configuration process instead of the deployment process.

As set forth above, the measuring laser projectors 102 register themselves with respect to the external coordinate system (step 701). The measuring laser projectors 102 scan the array of reference targets 111. Using the reference targets 111 as fiducials, the measuring laser projectors 102 find the angular directional coordinates toward centers of each of the reference targets 111 in their respective fields of view. The measuring laser projectors 102 then transmit that data to the computing system 101 for calculation of the location of the measuring laser projectors 102 in the external coordinate system.

Next, the measuring laser projectors 102 detect features of work object 202 (step 702). Detectable features include edges, corners, holes, fasteners, and the like that are native to the work object 202. No additional targets need be attached to the work object 202 in order to locate features such as these. To detect the features, the measuring laser projector 102 scans the surface of the work object 202 with a laser light beam, and receives diffusely reflected light at an optical signal sensor associated with the measuring laser projector 102. The received reflection data is stored in memory 105. The feature detection module 107 processes the received reflection data to detect the features and find their centers or vertices.

The measuring laser projector 102, in conjunction with location determining module 108 of the computer system 101, then determines the locations of the detected features, e.g., features 225 and 325-327, in the external coordinate system (step 703). That is, the measuring laser projector 102 finds the angular directional coordinates to the centers of the features 225 and 325-327. Using the angular direction coordinates, the computing system 101 then calculates the spatial coordinates of the centers or vertices of the features in the external coordinate system. To ensure precise and accurate projection of image data onto the work object 202, features at both ends of the work object 202 may be detected and located to allow for compensation for any deviation in the geometry of the work object 202 from the predicted geometry due to scale errors or thermal expansion.

The method 700 further includes obtaining the coordinates of the features in the work object coordinate system (step 704). The coordinates of the features in the object coordinate system are already known and are stored in a CAD model of work object 202. Accordingly, the computer system can obtain the coordinates by accessing the CAD model, locating the features therein, and extracting their locations from the CAD model.

After obtaining the coordinates of the work object features in the work object coordinate system (step 704), the method 700 includes obtaining a coordinate system transformation for converting coordinates in the external coordinate system to coordinates in the work object coordinate system (step 705). The transformation can be calculated by the computing system 101. The calculation is performed as follows.

$X_A$, $Y_A$, $Z_A$ represent the centers or vertices of the work object features obtained from the work object 202 CAD model. $X_E$, $Y_E$, and $Z_E$ correspond to the centers or vertices of the features determined in the external coordinate system in step 703 based on the data collected by the measuring laser projectors 102. The respective coordinates for each feature are used to compose an over-determined system of equations:

$$\begin{bmatrix} X1_E \\ Y1_E \\ Z1_E \end{bmatrix} = \begin{bmatrix} A_X \\ A_Y \\ A_Z \end{bmatrix} + R_A \times \begin{bmatrix} X1_A \\ Y1_A \\ Z1_A \end{bmatrix} \quad (1)$$

$$\begin{bmatrix} X2_E \\ Y2_E \\ Z2_E \end{bmatrix} = \begin{bmatrix} A_X \\ A_Y \\ A_Z \end{bmatrix} + R_A \times \begin{bmatrix} X2_A \\ Y2_A \\ Z2_A \end{bmatrix}$$

Where $A_X$, $A_Y$, and $A_Z$ are the unknown location coordinates of the object coordinate system's origin with respect to the external coordinate system, and $R_A$ is the orientation matrix of the work object 202 with respect to the external coordinate system. $R_A$ contains three unknown rotational angles: ω, φ, and κ (pitch, yaw, and roll). $R_A$ can be expressed as follows:

$$R_A = \begin{bmatrix} m_{11} & m_{21} & m_{31} \\ m_{12} & m_{22} & m_{32} \\ m_{13} & m_{23} & m_{33} \end{bmatrix} \quad (2)$$

Where the m terms equate to:

$$\begin{cases} m_{11} = \cos\varphi \cdot \cos\kappa \\ m_{12} = \sin\omega \cdot \sin\varphi \cdot \cos\kappa + \cos\omega \cdot \sin\kappa \\ m_{13} = -\cos\omega \cdot \sin\varphi \cdot \cos\kappa + \sin\omega \cdot \sin\kappa \\ m_{21} = -\cos\varphi \cdot \sin\kappa \\ m_{22} = -\sin\omega \cdot \sin\varphi \cdot \sin\kappa + \cos\omega \cdot \cos\kappa \\ m_{23} = \cos\omega \cdot \sin\varphi \cdot \sin\kappa + \sin\omega \cdot \cos\kappa \\ m_{31} = \sin\varphi \\ m_{32} = -\sin\omega \cdot \cos\varphi \\ m_{33} = \cos\omega \cdot \cos\varphi \end{cases} \quad (3)$$

The system of equations (1) contains 3N number of equations, where N is the number of the features at the front and at the back of the work object 202. The minimum number N is 3 but, typically, at least 3 features are measured at both the front and the back of the work object 202. This approach can mitigate any impact of ambient temperature and scale errors on the difference between the CAD model data and the real feature coordinates.

The system (1) really has six unknowns $A_X$, $A_Y$, $A_Z$, ω, φ, and κ. The set of these six unknowns defines the location and orientation of the work object 202 with respect to the external coordinate system. The system (1) is nonlinear with respect to its unknowns and it is an over determined system because the number of equations 3N always exceeds the number of unknowns. Once composed, the system (1) is solved by the least squares method. This method averages measurement results for all the features, front and back, and minimizes total error. Hence, solving the system results in the location and orientation of the work object 202 with respect to the external coordinate system. Once the angles ω, φ, and κ are computed by solving system of equation (1), the orientation matrix $R_A$ can be populated with values obtained in accordance with expressions (2) and (3).

Once $R_A$ is populated, its inverse transformation matrix $R_E$ can be found by transposing $R_A$:

$$R_E = R_A{}' \quad (4)$$

$R_E$ can then be used to obtain $X_{TA}$, $Y_{TA}$, and $Z_{TA}$, the coordinates for the reference targets 111 with respect to the object coordinate system (step 706), as follows:

$$\begin{bmatrix} X_{TA} \\ Y_{TA} \\ Z_{TA} \end{bmatrix} = R_E \times \begin{bmatrix} X_{TE} - A_X \\ Y_{TE} - A_Y \\ Z_{TE} - A_Z \end{bmatrix} \quad (5)$$

Where $X_{TE}$, $Y_{TE}$, and $Z_{TE}$ are the known coordinates of the reference targets 111 with respect to the external coordinate system (determined as part of step 603 shown in FIG. 6), and $A_X$, $A_Y$, and $A_Z$ are the location coordinates of the origin of the object coordinate system with respect to the external coordinate system previously obtained by solving the system of equations (1).

Now that the coordinates of the reference targets 111 with respect to the object coordinate system are known, the measuring laser projectors 102 and non-measuring laser projectors 103 used for illuminating the work object 202 perform a buck-in with respect to the locations of the reference targets 111 in the object coordinate system (step 707). To buck-in the measuring laser projectors 102, the computing system 101 applies the transformation matrix to the coordinates found for the measuring laser projectors 102 in the external coordinate system to obtain their coordinates in the work object coordinate system. To buck in the non-measuring laser projectors 103, the non-measuring laser projectors 103 direct their respective lasers beams within their fields of view, much as the measuring laser projectors 102 did in step 701. The non-measuring laser projectors 103 detect light reflected from the reference targets 111 in their respective fields of view and determine the angular coordinates thereof. In some implementations, the computing system 101 then uses this data along with its knowledge of the location of the reference targets 111 in the work object coordinate system to determine the coordinates of the non-measuring laser projectors 103 in that coordinate system. In some implementations, this can include first determining the location of the non-measuring laser projectors 103 in the external coordinate system and then applying the above-described transformation matrix to convert the coordinates into work object coordinate system coordinates. In other implementations, the computing system determines the coordinates of the non-measuring laser projectors 103 directly in the work object coordinate system.

In this example, the image data are expressed in the object coordinate system. To project this image data, the measuring laser projectors 102 and non-measuring laser projectors 103 are bucked-in to locations of reference targets 111 in the object coordinate system. Therefore, the object coordinate system serves as a common coordinate system for the implementations described above. The choice of common coordinate system is arbitrary, however. Methods using the external coordinate system as a common coordinate system can also be performed without departing from the scope of this disclosure. In such implementations, similar matrices are used to convert the work object locations into locations in the external coordinate system.

After completion of step 707, the measuring laser projectors 102 and non-measuring laser projectors 103 are registered with respect to the work object coordinate system and thus the laser projection system 100 is ready for the continuation of the livery layout method 600 shown in FIG. 6.

Referring back to FIG. 6, the livery layout process 600 continues with illumination of the work object 202 by the virtual laser projection system 100 (step 605). The virtual laser projection system 100 receives image data, which it then projects onto the work object 202, thereby illuminating guidelines; for example, a livery layout for aiding in the application of a livery mask. The livery mask is then applied (step 606).

Once the livery mask or other stenciling has been applied, the portions of the virtual laser projection system 100 positioned in the work cell can be removed from the work cell (step 607). In some implementations, the computing system 101 can be operated remotely from the work cell 100 throughout the process, and thus may not need to be removed. The measuring laser projectors 102, non-measuring laser projectors 103, and reference targets 111 can be removed from the work cell and returned to storage where the devices can be serviced, have their batteries recharged, or undergo other offline maintenance. Removal of the measuring laser projectors 102, non-measuring laser projectors 103, and reference targets 111 prior to the painting step prevents fouling of the devices with paint or other substances used in the painting process, and promotes safety by reducing the amount of electrical equipment present during the painting process. Finally, paint is applied to the work object (step 608).

While the invention has been described with reference to the foregoing exemplary embodiments, and certain presently preferred features and embodiments, it will be understood that various modifications and alterations will occur to those skilled in the art from the foregoing detailed description and the accompanying drawings. For example, it is not necessary that the devices of the virtual laser projection system 100 be removable; indeed it would be possible to mount them permanently or semi permanently within the work cell, and instead shelter them with removable hoods or mechanical shutters to protect the optics and other sensitive areas from fouling during the painting process. In another example, mirrors, prisms, or other optics can be added to the system to increase the area of the work object 202 that can be illuminated by each measuring laser projectors 102 and non-measuring laser projector 103 beyond what is directly visible within its native field of view. In another example, other measuring devices can be used to perform the role of the measuring laser projectors 102 so long as the non-contact measuring devices can detect the reference targets 111 and features of the work object 202.

These and other modification and alterations will be apparent to those skilled in the art and are intended to fall within the scope of the appended claims.

What is claimed is:

1. A laser projection system for projecting image data onto a surface of a work object, the system comprising:
an array of reference targets spaced from, and not in direct contact with, the work object;
a measuring laser projector;
at least one non-measuring laser projector different from the measuring laser projector; and
a computer having one or more processors configured to:
cause the measuring laser projector to direct a first laser light beam at a subset of the targets in the array of reference targets;
cause the measuring laser projector to receive reflected light from the subset of the targets in the array of reference targets;
register the measuring laser projector with respect to a first coordinate system based on the received reflected light, the first coordinate system is a coordinate system associated with the array of reference targets and is external to the work object;
cause the measuring laser projector to direct a second laser light beam onto the work object surface;
cause the measuring laser projector to receive diffusely reflected light from the work object surface;
detect a plurality of features of the work object surface based on the received diffusely reflected light;
determine the locations of the plurality of features with respect to the first coordinate system;
obtain the locations of the plurality of features with respect to a second coordinate system different from the first coordinate system, the second coordinate system being the work object coordinate system;
determine the locations of the plurality of features and the at least one non-measuring laser projector in a common coordinate system; and
cause the at least one non-measuring laser projector to project the image data onto the work object surface based on the locations of the plurality of features and the location of the at least one non-measuring laser projector in the common coordinate system.

2. The system of claim 1, wherein the array of reference targets comprises retro-reflectors.

3. The system of claim 1, wherein the one or more processors are further configured to:
cause the at least one non-measuring laser projector to direct a third laser light beam at a second subset of the targets in the array of reference targets;
cause the at least one non-measuring laser projector to receive reflected light from the second subset of targets in the array of reference targets; and
register the at least one non-measuring laser projector with respect to the first coordinate system.

4. The system of claim 1, wherein the one or more processors are further configured to cause the measuring laser projector to project image data onto the work object surface.

5. The system of claim 1, wherein the at least one non-measuring laser projector includes at least one of the reference targets of the array of reference targets coupled to a support structure supporting the at least one non-measuring laser projector in position.

6. The system of claim 1, wherein at least one of the measuring laser projector and the at least one non-measuring laser projector is mounted on a moveable cart.

7. The system of claim 1, wherein the position of at least a subset of reference targets in the array of reference targets is fixed within a work cell and the first coordinate system is a coordinate system associated with the work cell.

8. The system of claim 1, wherein the position of the array of reference targets is movable within a work cell.

9. The system of claim 1, wherein the common coordinate system is the first coordinate system, and determining the locations of the plurality of features and the at least one non-measuring laser projector in the common coordinate system comprises converting coordinates of the plurality of features in the second coordinate system into coordinates in the first coordinate system.

10. The system of claim 1, wherein the common coordinate system is the second coordinate system, and determining the locations of the plurality of features and the at least one non-measuring laser projector in the common coordinate system comprises converting coordinates of the at least one non-measuring laser projector in the first coordinate system into coordinates in the second coordinate system.

11. A method for projecting image data onto a surface of a work object, the method comprising:
directing a first laser light beam from a measuring laser projector at a subset of targets in an array of reference targets spaced from, and not in direct contact with, the work object;
receiving the reflected light from the subset of targets in the array of reference targets at the measuring laser projector;
registering the location of the measuring laser projector with respect to a first coordinate system based on the received reflected light, the first coordinate system is a coordinate system associated with the array of reference targets and is external to the work object;
directing a second laser light beam from the measuring laser projector at the work object surface;
receiving diffusely reflected light from the work object surface at the measuring laser projector;
detecting a plurality of features of the work object surface based on the diffusely reflected light;
determining the locations of the plurality of features with respect to the first coordinate system;

obtaining the locations of the plurality of features with respect to a second coordinate system different from the first coordinate system, the second coordinate system being the work object coordinate system;

determining the locations of the plurality of features and at least one non-measuring laser projector different from the measuring laser projector in a common coordinate system; and projecting the image data onto the work object surface based on the locations of the plurality of features and the location of the at least one non-measuring laser projector in the common coordinate system.

12. The method of claim 11, wherein the array of reference targets comprises retro-reflectors.

13. The method of claim 11, further comprising:

directing a third laser light beam at a second subset of targets in the array of reference targets using the at least one non-measuring laser projector;

receiving reflected light from the second subset of targets in the array of reference targets at the at least one non-measuring laser projector; and registering the at least one non-measuring laser projector with respect to the first coordinate system.

14. The method of claim 11, further comprising: projecting the image data onto the work object surface using the measuring laser projector.

15. The method of claim 11, wherein the at least one non-measuring laser projector includes at least one of the reference targets of the array of reference targets coupled to support structure supporting the at least one non-measuring laser projector in position.

16. The method of claim 11, wherein at least one of the measuring laser projector and the at least one non-measuring laser projector is mounted on a moveable cart.

17. The method of claim 16, wherein the image data corresponds to a paint mask, and wherein the method further comprises removing at least one of the measuring laser projector, the array of reference targets, and the at least one non-measuring laser projector from a work cell after the paint mask is applied, and before paint is applied.

18. The method of claim 11, wherein the position of at least a subset of the reference targets in the array of reference targets is fixed within a work cell, and the first coordinate system is a coordinate system associated with the work cell.

19. The method of claim 11, wherein the common coordinate system is the first coordinate system, and determining the locations of the plurality of features and the at least one non-measuring laser projector in the common coordinate system comprises converting coordinates of the plurality of features in the second coordinate system into coordinates in the first coordinate system.

20. The method of claim 11, wherein the common coordinate system is the second coordinate system, and determining the locations of the plurality of features and the at least one non-measuring laser projector in the common coordinate system comprises converting coordinates of the at least one non-measuring laser projector in the first coordinate system into coordinates in the second coordinate system.

* * * * *